Figure 1:
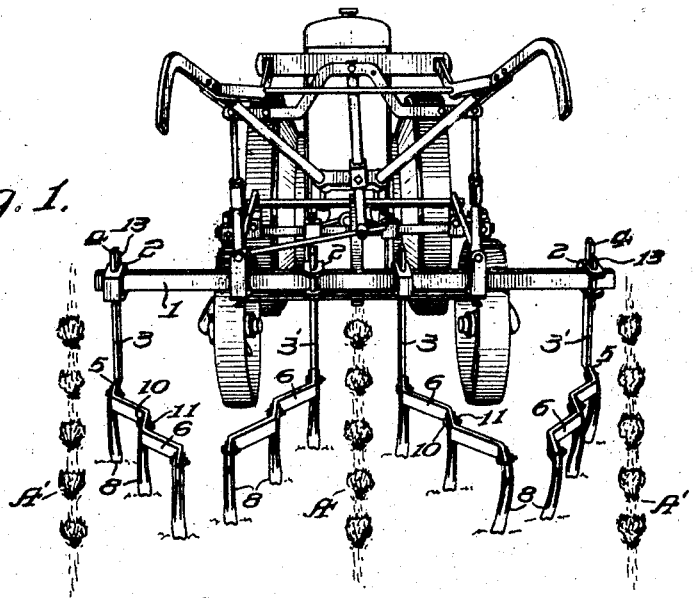

J. MADER.
AGRICULTURAL IMPLEMENT.
APPLICATION FILED JUNE 9, 1920.

1,375,854.

Patented Apr. 26, 1921.

INVENTOR
Joseph Mader.

WITNESS

BY
ATTORNEYS

UNITED STATES PATENT OFFICE.

JOSEPH MADER, OF PHILADELPHIA, PENNSYLVANIA, ASSIGNOR TO S. L. ALLEN & CO., INC., A CORPORATION OF PENNSYLVANIA.

AGRICULTURAL IMPLEMENT.

1,375,854.  Specification of Letters Patent.  Patented Apr. 26, 1921.

Application filed June 9, 1920. Serial No. 387,523.

*To all whom it may concern:*

Be it known that I, JOSEPH MADER, a citizen of the United States, and a resident of the city of Philadelphia, county of Philadelphia, and State of Pennsylvania, have invented certain new and useful Improvements in Agricultural Implements, of which the following is a specification, reference being had to the accompanying drawing.

My invention relates more particularly to cultivating implements and is especially adapted for use in connection with garden or other tractors, although it may, if desired, be employed with other forms of tractive power.

Among the principal objects of my invention are to provide a novel form of cultivating implement which may be readily adjusted for the simultaneous cultivation of a plurality of rows of plants spaced at similar or different widths; which is particularly suitable for operation in connection with a garden or other tractor and which is so constructed that, by suitable adjustment of the various elements, a relatively large area may be cultivated at one time without increasing the size of the implement to a point at which it will become too cumbersome and bulky for convenient use.

A further object of my invention is to so design and arrange certain of the elements of the implement as to assist automatically in freeing the cultivator blades or teeth from accumulation of soil so that the teeth will always be maintained in a condition to perform their work with maximum efficiency.

Still further objects of my invention are to provide a cultivating implement of novel design and construction in which the blade holding elements may be vertically adjusted to give any desired clearance within limits and laterally adjusted in conformity with the spacing of the plant rows; which embodies a relatively small number of parts and these of simple design, not liable to get out of order or be damaged in use, and in which the ground working tools or blades may be readily changed.

My invention further includes all of the other various objects and novel features of construction and arrangement hereinafter more definitely specified and described.

In the accompanying drawing I have illustrated a preferred form of my invention and since, as hitherto stated, the same is particularly adapted for use in connection with a tractor, I have shown the implement in one of the figures connected to a typical garden tractor, but as the specific form and construction of the latter form no part of the invention, it will be understood that other forms of tractors, or in fact, any suitable form of tractive power may be utilized therewith.

Figure 2:
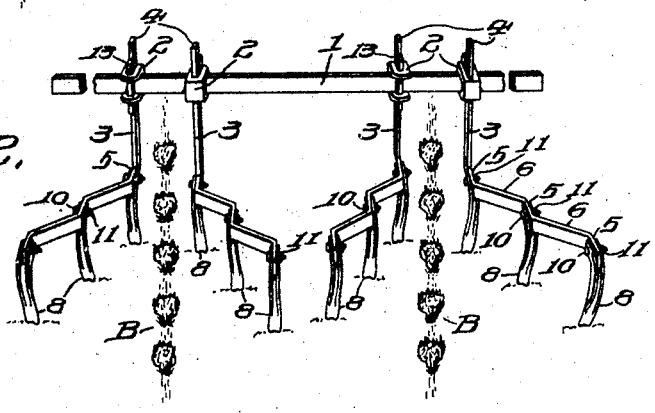
Figure 3:
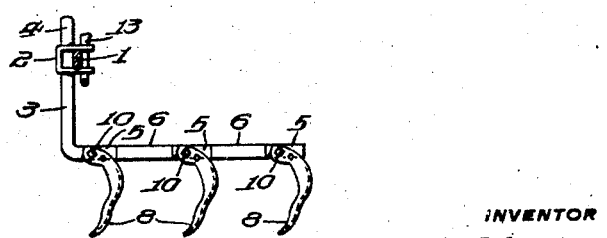

Referring now more specifically to the drawing, in which like numerals are utilized to designate similar parts in the different figures, Figure 1 is a rear perspective view of a preferred form of the invention showing the same connected to a garden tractor and with the parts adjusted for the simultaneous cultivation of both sides of one row of plants and one side of each of the two laterally disposed adjacent rows; Fig. 2 is a rear perspective view of the implement removed from the tractor and showing the parts adjusted for simultaneous cultivation of both sides of two adjacent rows of plants, and Fig. 3 is a side elevation of one of the blade shanks with the supporting or gang bar shown in section.

The form of the invention shown comprises a transversely extending supporting or gang bar 1 to which are adjustably secured, as by suitable clamps 2, the blade or tooth shanks 3, 3'. Each of these shanks comprises a vertically upwardly extending portion 4 and a horizontally rearwardly extending portion so that in profile, as shown in Fig. 3, each shank is substantially of L-shape. Each shank is preferably formed from a single bar of suitable size and rectangular section, and the horizontal portion of the shank is alternately directed first rearwardly and than laterally so as to provide a plurality of tool or blade seats 5, respectively arranged in parallel relation and connected by diagonally extending portions 6, as best shown in Figs. 1 and 2. The seats 5 are adapted for the reception of the upper part of the ground working tools which may be in the form of cultivator blades or teeth 8 of any suitable type and construction and preferably attached to their respective seats by transversely extending bolts 10 carrying nuts 11 which bolts pass through the teeth and through the seats, the upper portions of the teeth being preferably formed to provide a channel adapted to receive the seats and the lower ends of the teeth being suitably flattened and sharpened to facilitate their entrance into the soil. It will, however, be understood that the particular shape and construction of the teeth is immaterial and that while any suitable means may preferably be employed for removably securing them to their respective seats, in certain constructions it may be desirable to rivet or otherwise permanently secure them in position.

The vertically extending portions of the shanks may be adjustably secured to the gang bar in any suitable manner so as to permit both their vertical and longitudinal adjustment with respect thereto and preferably by means of suitable clamps 2 which provide slotted portions overlying and underlying the gang bar and through which the vertical portions of the shanks extend so as to lie adjacent the gang bar, a wedge 13 bearing on the opposite face of the gang bar and extending through the slots serving, when driven home, to jam the gang bar against the shank and hold the latter in rigid operative adjusted relation on the bar.

It will be understood that while the several tool carrying shanks are similar in their general design, one-half of them are preferably made right handed and the other half left handed, or, in other words, that the shanks 3 have their tooth seats offset to the right when viewed as in Figs. 1 and 2 and that the shanks 3' have their tooth seats offset to the left when similarly viewed, and further, that the shanks are preferably arranged in pairs 3, 3' on the gang bar so that the horizontal portions of each pair will either converge toward their rearmost extremities, as shown in Fig. 1, or diverge toward their rearmost extremities, as shown in Fig. 2, and that the vertical portions of each pair are preferably placed on opposite sides of the bar so as to give a slightly staggered relation to the blades.

In operation the implement may preferably be suitably connected to a garden tractor or other form of tractive means, conveniently, for example, as shown in Fig. 1.

While it will be evident that any desired number of the shanks may be attached to the gang bar, conveniently two pairs are employed and are arranged either as shown in Fig. 1 with their rearmost extremities converging, in which position the implement is adapted for simultaneous cultivation of the soil adjacent both sides of a single row of plants A and adjacent one side of each of the laterally disposed rows A', or, as shown in Fig. 2, with their rearmost extremities diverging, in which position the implement is adapted for simultaneous cultivation of the soil adjacent both sides of two adjacent rows B, it being of course understood that the shanks are initially adjusted vertically on the gang bar to give the desired ground clearance and laterally thereon so as to bring the teeth in proper relation to the rows being cultivated.

Furthermore, owing to the peculiar construction of the shanks and the fact that they are supported solely by the vertical portions 4, in operation it is found that there is considerable vibratory movement of the horizontal portions of the shanks increasing toward their rearmost extremities, which assists materially in freeing the teeth from accumulations of soil and thereby maintaining them at all times during operation in a condition of maximum efficiency.

While I have herein illustrated and described with considerable particularity a preferred embodiment of my invention, I do not thereby desire or intend to limit myself specifically thereto as suitable changes and modifications may be made in the details thereof as may be desired without departing from the spirit and scope of the invention as defined in the appended claims.

Having thus described my invenion I claim and desire to protect by Letters Patent of the United States:

1. An attachment for a hand guided tractor comprising a supporting bar, a plurality of tool carrying shanks supported on said bar in vertical and longitudinal adjusted relation thereto, each of said shanks comprising a vertical portion adjacent said bar and a horizontal portion extending rearwardly therefrom, said horizontal portion being laterally offset to provide a plurality of parallel tool seats and diagonally extending portions connecting said seats, and a ground working tool secured to each of said seats.

2. An attachment for a hand guided tractor comprising a supporting bar, means for adjustably connecting said bar with the tractor, a plurality of tool carrying shanks arranged in pairs, each shank having a vertical portion and a horizontal portion, means for supporting said vertical portions on said bar in vertical and longitudinal adjusted relation with respect thereto, the horizontal portion of each shank being laterally offset to provide a plurality of parallel tool seats and diagonally extending portions connecting said seats, and a ground working tool operatively supported on each of said seats, one shank of each pair of shanks being arranged so that the offset portion extends in one direction and the other shank of said pair being arranged so that the offset portion extends in the opposite direction.

3. A unitary tool carrying shank for an attachment for a hand guided tractor comprising a vertically extending portion and an integral horizontally extending portion, said latter portion having a plurality of parallel laterally offset tool seats and diagonally extending portions connecting said seats.

In witness whereof, I have hereunto set my hand this 7th day of June, 1920.

JOSEPH MADER.